(12) United States Patent
Miller et al.

(10) Patent No.: US 10,754,639 B2
(45) Date of Patent: Aug. 25, 2020

(54) SOFTWARE FIX INSTALLATION RATE MANAGEMENT

(71) Applicant: International Business Machines Corporation, Armonk, NY (US)

(72) Inventors: Keith J. Miller, Pawling, NY (US); Anthony T. Sofia, Hopewell Junction, NY (US); Marna Walle, Pawling, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/106,589

(22) Filed: Aug. 21, 2018

(65) Prior Publication Data

US 2020/0065089 A1    Feb. 27, 2020

(51) Int. Cl.
*G06F 8/658* (2018.01)
*G06F 11/30* (2006.01)
*G06F 16/901* (2019.01)

(52) U.S. Cl.
CPC .......... *G06F 8/658* (2018.02); *G06F 11/3086* (2013.01); *G06F 16/901* (2019.01)

(58) Field of Classification Search
CPC ..... G06F 8/658; G06F 16/901; G06F 11/3086
USPC ........................................................ 717/168
See application file for complete search history.

(56) References Cited

U.S. PATENT DOCUMENTS

| | | | |
|---|---|---|---|
| 6,055,363 A | 4/2000 | Beals et al. | |
| 6,202,207 B1 | 3/2001 | Donohue | |
| 6,237,020 B1 | 5/2001 | Leymann et al. | |
| 6,976,251 B2 | 12/2005 | Meyerson | |
| 7,096,464 B1 | 8/2006 | Weinmann | |
| 7,143,406 B2 | 11/2006 | Kenyon et al. | |
| 7,315,856 B2 | 1/2008 | Iulo et al. | |

(Continued)

OTHER PUBLICATIONS

Vaniea et al, "Tales of Software Updates: The process of updating software", [Online], 2016, pp. 3215-3226, [Retrieved from internet on Apr. 16, 2020], <https://dl.acm.org/doi/abs/10.1145/2858036.2858303> (Year: 2016).*

(Continued)

*Primary Examiner* — Geoffrey R St Leger
*Assistant Examiner* — Zengpu Wei
(74) *Attorney, Agent, or Firm* — Cantor Colburn LLP; Teddi Maranzano

(57) ABSTRACT

A system and method of automating software fix installation rate management for a software package including two or more hierarchical levels include obtaining information from two or more customer systems. The information indicates software fixes installed at each of the two or more customer systems. The method also includes generating a report corresponding with each of the two or more customer systems. The report indicates a number of the software fixes installed at the respective one of the two or more customer systems as compared with an average number of the software fixes installed at the two or more customer systems at one of the two or more hierarchical levels. Determining whether to increase, decrease, or maintain a rate of installation of the software fixes at each of the two or more customer systems is based on the report corresponding with each of the two or more customer systems.

20 Claims, 4 Drawing Sheets

(56) References Cited

U.S. PATENT DOCUMENTS

| | | | | |
|---|---|---|---|---|
| 8,793,681 | B2* | 7/2014 | Ayachitula | G06F 8/65 |
| | | | | 717/171 |
| 9,032,388 | B1* | 5/2015 | Watson | G06F 21/57 |
| | | | | 717/170 |
| 2007/0169079 | A1 | 7/2007 | Keller et al. | |
| 2008/0301666 | A1* | 12/2008 | Gordon | G06F 8/65 |
| | | | | 717/172 |
| 2009/0204946 | A1* | 8/2009 | Fienblit | G06F 8/71 |
| | | | | 717/124 |
| 2012/0324435 | A1* | 12/2012 | Somani | G06F 8/71 |
| | | | | 717/170 |
| 2012/0331455 | A1* | 12/2012 | Ayachitula | G06F 8/65 |
| | | | | 717/171 |
| 2013/0159985 | A1 | 6/2013 | Gilman et al. | |
| 2013/0318180 | A1 | 11/2013 | Amin et al. | |
| 2016/0117160 | A1* | 4/2016 | Parthasarathy, Sr. | G06F 8/65 |
| | | | | 717/171 |
| 2018/0011700 | A1* | 1/2018 | Plate | G06F 8/65 |

OTHER PUBLICATIONS

Ilvonen et al, "Dynamic Software Updating Techniques in Practice and Educator's Guides: A Review", [Online], 2016, pp. 86-90, [Retrieved from internet on Apr. 16, 2020], <https://ieeexplore.ieee.org/stamp/stamp.jsp?tp=&arnumber=7474470> (Year: 2016).*

Radianti et al, "Assessing Risks of Policies to Patch Software Vulnerabilities", [Online], 2006, pp. 1-21, [Retrieved from internet on Apr. 16, 2020], <https://proceedings.systemdynamics.org/2006/proceed/papers/GONZA409.pdf> (Year: 2006).*

* cited by examiner

SOFTWARE FIX INSTALLATION RATE MANAGEMENT

BACKGROUND

The present invention relates to software fixes, and more specifically, to software fix installation rate management.

A software package can include an operating system or other program with multiple components, each having multiple functions. A software package can be sold to various customers and entail follow-on management of the software package that includes the development of software fixes (also referred to as patches). Software fixes can include corrections of errors or faults (also referred to as bugs) and also upgraded functionality of certain components. The various customers of a given software package can register their interest to receive different ones of the available or planned (i.e., not yet available) software fixes for the software package. The velocity of installs refers to the rate at which software fixes are installed (i.e., implemented) by a given customer. A customer with a high velocity of installs can be well ahead of other customers in terms of installation of the available software fixes. This can result in the customer having a less common system than that of other customers. In this case, the customer can encounter new issues that others have not yet seen and, thus, that have not been addressed. Conversely, a customer with a low velocity of installs can be operating a software package that has fewer software fixes installed than other customers. This can result in the customer having a less stable system than that of other customers and encountering issues that have already been found and addressed with software fixes.

SUMMARY

Embodiments of the present invention are directed to a computer-implemented method, management system, and computer program product for automating software fix installation rate management for a software package including two or more hierarchical levels. The method includes obtaining information from two or more customer systems. The information indicates software fixes installed for the software package at each of the two or more customer systems. The method also includes generating a report corresponding with each of the two or more customer systems. The report indicates a number of the software fixes among available ones of the software fixes installed at the respective one of the two or more customer systems as compared with an average number of the software fixes installed at the two or more customer systems at one of the two or more hierarchical levels. Determining whether to increase, decrease, or maintain a rate of installation of the software fixes at each of the two or more customer systems is based on the report corresponding with each of the two or more customer systems.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

The various customers of a software package must decide which available software fixes to install and how often to install software fixes. As previously noted, too high or low a velocity of install can result in a given customer running a less common or less stable system than other customers. Either of these scenarios can prove detrimental. Embodiments of the systems and methods detailed herein relate to software fix installation rate management. Information obtained from each customer of a given software package is used to indicate a given customer's velocity of install status among all the customers. Information about software fixes for which each reporting customer has expressed interest (i.e., registered) can also be used to indicate which software fixes are installed by or registered for by each customer. Information about issues encountered by each customer can also be obtained. The information can be used to generate recommendations regarding software fixes specific to each customer for each function and component of the software package.

According to one or more embodiments of the invention, the information can also result in automated installation of software fixes. The management system that receives the information from the various customers can push software fixes to each customer for installation, or recommendations from the management system can be used to automatically install software fixes subject to modification. Based on the software fix installation advice or automated software fix installation according to one or more embodiments of the invention, the performance of the customer system executing the software package is improved and the performance is better-managed.

Figure 1:
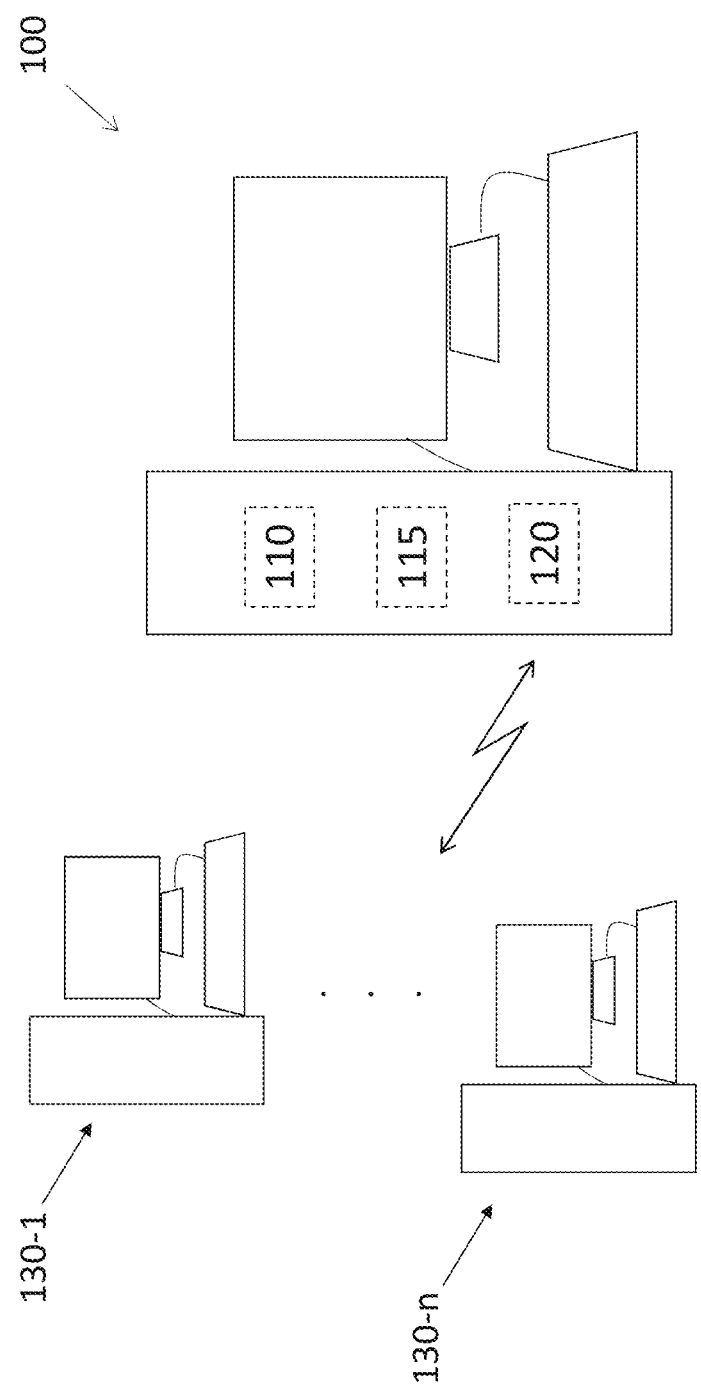
FIG. 1 is a block diagram of a management system to provide automated software fix installation rate management according to one or more embodiments of the invention.

FIG. 1 is a block diagram of a management system 100 to provide automated software fix installation rate management according to one or more embodiments of the invention. As previously noted, the software fix can correspond with a component or function of the software package (e.g., operating system). The management system 100 includes processing circuitry 110 and memory 115 that is used to analyze information obtained from various customers regarding their installation and use of software fixes. The management system 100 also includes a communication interface 120 to communicate with customer systems 130-1 through 130-$n$ (generally referred to as 130). The communication interface 120 can be wired or wireless. The customers systems 130 can voluntarily share information with the management system 100 in order to facilitate determination of implementation of software fixes within each of the customer systems 130 and individual recommendations.

Figure 2:
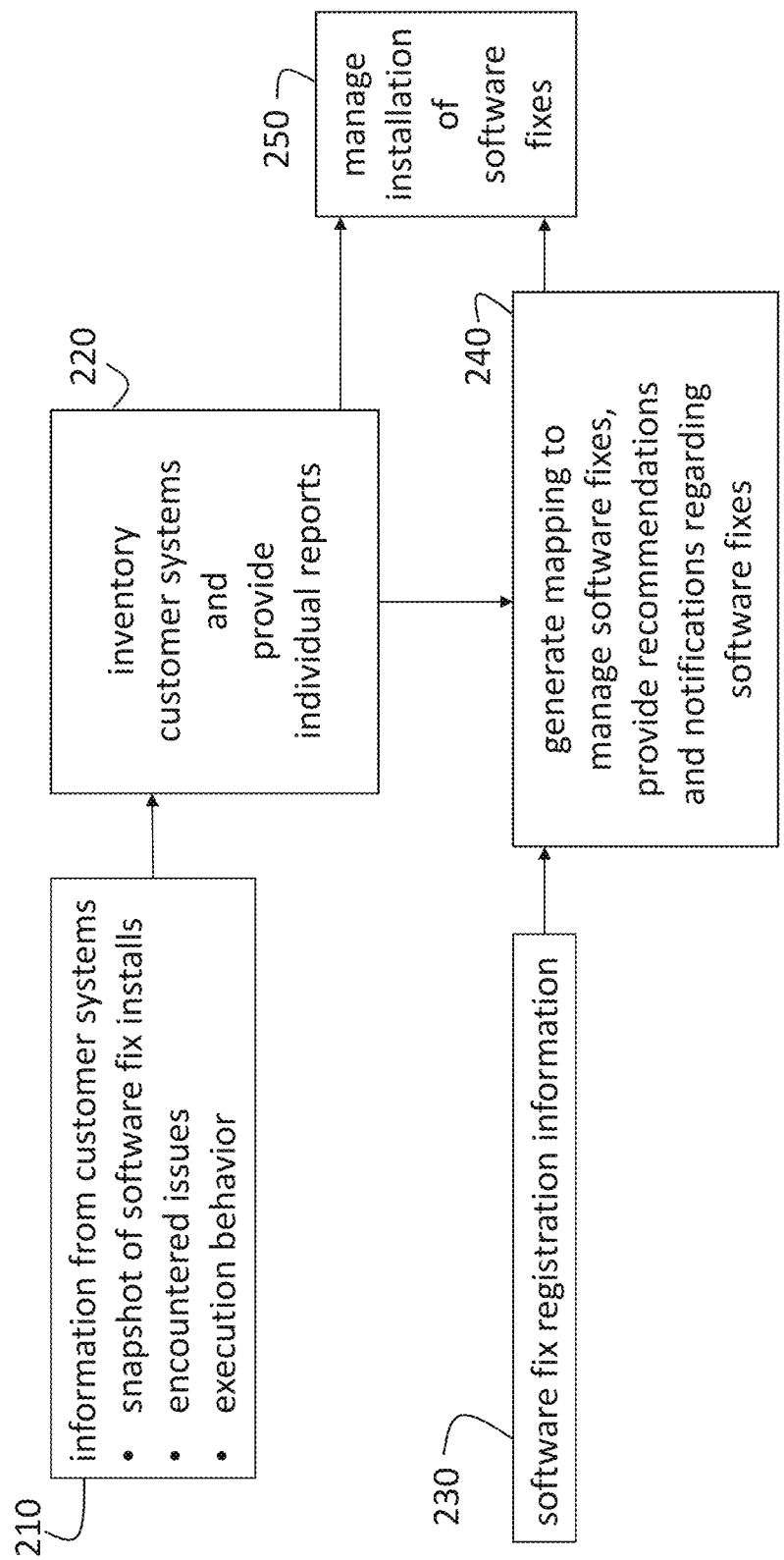
FIG. 2 is a process flow of a method of providing automated software fix installation rate management according to one or more embodiments of the invention.

FIG. 2 is a process flow of a method of providing software fix installation rate management according to one or more embodiments of the invention. At block 210, the processes include receiving information from customer systems 130. As previously noted, the information can be provided on a voluntary basis by the customer systems 130. An update from a given customer system 130 can be triggered by an installation of a software fix, for example. As another example, each customer system 130 can be queried by the management system 100 periodically or based on a trigger (e.g., a query by a customer system 130 regarding status or a particular software fix). The information includes a snapshot of the software fix installs on the customer system 130 providing the information.

The information can optionally include information about issues encountered by the customer system 130 during execution of the software package. Also optionally, execution behavior can be included in the information provided to the management system 100. The execution behavior indicates function calls and other execution information along with the associated runtime. Based on the execution behavior, the management system 100 can know not only what software fixes have been installed by a given customer system 130 but also which software fixes are being used and operational parameters of functions with software fixes installed.

At block 220, inventorying customer systems 130 and providing individual reports 300 (FIG. 3) is further discussed with reference to FIG. 3. Based on the information provided at block 210, the inventory of customer systems 130 can include not only the software fixes that are installed but also issues that have been encountered for the software package. Obtaining software fix registration information, at block 230, refers to the management system 100 obtaining information about pending software fix requests submitted by each customer system 130. This information, in addition to the inventory information obtained at block 220, facilitates the processes performed at block 240.

Specifically, at block 240, the processes include the management system 100 generating a mapping 400 (FIG. 4) to manage software fixes and provide recommendations and notifications regarding software fixes. This is further discussed with reference to FIG. 4. At block 250, managing the installation of software fixes, at each of the customer systems 130, is based on the information provided in one or more individual reports 300 (at block 220) and the mapping 400 (at block 240) by the management system 100.

As previously noted, the installation, at block 250, can be automated based on the management system 100 pushing software fixes to each customer system 130 or based on the management system 100 making recommendations to each customer system 130. The software fixes that are pushed for automatic installation or the recommendations can be automatically or manually modified at the customer system 130. For example, a recommendation regarding a function or component that has not been executed in the customer system 130 in a specified period of time or over a specified number of executions of the software package may be discarded from automatic installation. Modifications based on encountered issues or execution behavior are further discussed with reference to FIG. 3.

Figure 3:
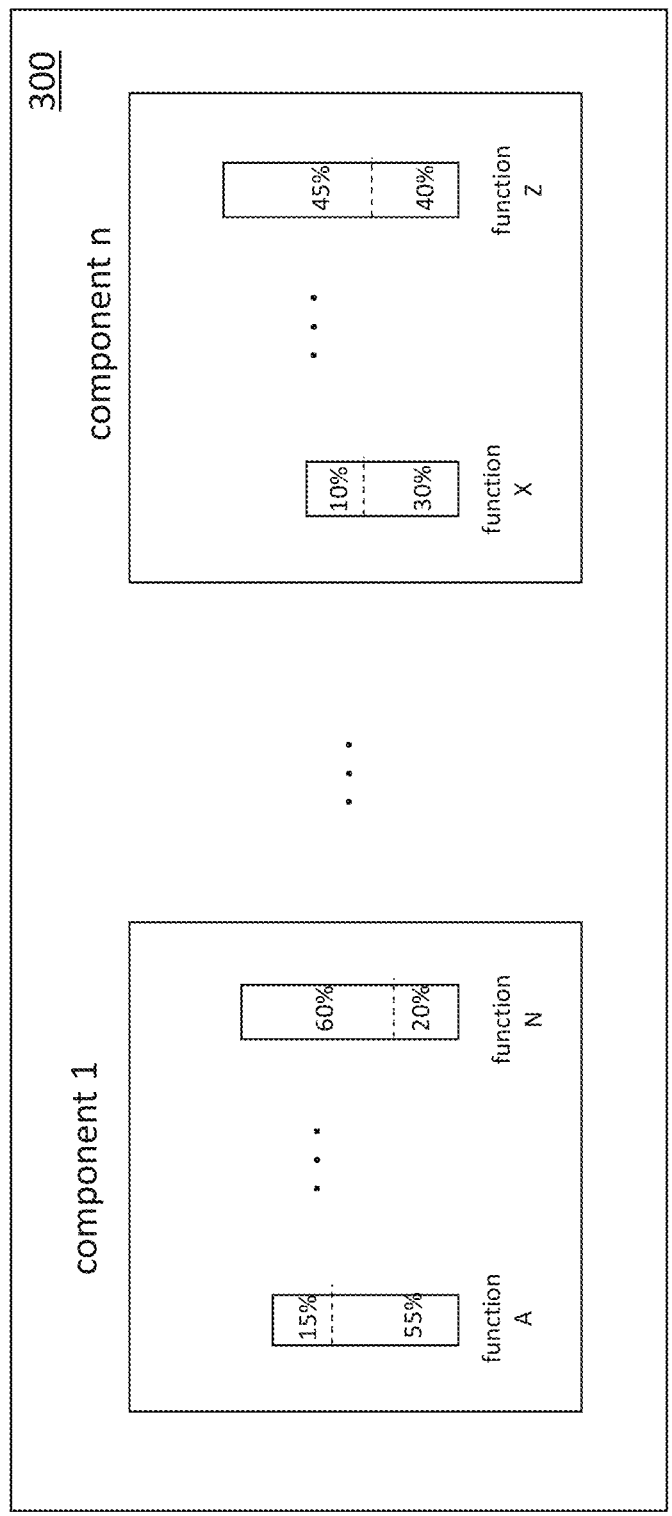
FIG. 3 is an exemplary individual report provided to a customer system by the management system according to one or more embodiments of the invention.

FIG. 3 is an exemplary individual report 300 provided to a customer system 130 by the management system 100 (at block 220) according to one or more embodiments of the invention. The snapshot of installed software fixes that is provided by the customer system 130 and other customer systems 130 (at block 210) is used. In the exemplary individual report 300, every function of every component of the software package is shown with an indication of the percentage (%) of corresponding software fixes that were installed by the customer system 130 as compared with other customer systems 130. While the exemplary hierarchical breakdown of a software package is described as including components which each include functions, the nomenclature is used only for explanatory purposes. According to alternate nomenclature, the software package can be subdivided into functions that each include components, for example. Other terms may be used altogether to describe the hierarchy.

In the exemplary individual report 300 shown in FIG. 3, the exemplary software package is shown to include components 1 through n. Component 1 includes functions A through N, and component n includes functions X through Z. The average percentage of available software fixes that were installed by all reporting customer systems 130 (at block 210) is shown at the bottom and the percentage of available software fixes that were installed by the given customer system 130 associated with the individual report 300 is shown at the top for each function. Thus, for example, function A of component 1 has only 15% of the available software fixes implemented by the given customer system 130, while, the average installation rate for function A by all reporting customer systems 130 is 55%. This information suggests that the installation rate or velocity of installs of software fixes for function A of component 1 should be increased for the given customer system 130. The individual report 300 shown in FIG. 3 can be accompanied by suggestions based on the inventory developed at block 220 by the management system 100. Thus, as shown in Table 1, the suggestion for function A of component 1 would be "increase velocity of install of software fixes" according to the example.

As another example, the given customer system 130 corresponding with the exemplary individual report 300 has 60% of available software fixes for function N of component 1 installed, while all reporting customer systems 130 only have 20% of available software fixes installed on average. This suggests that the velocity of installs of software fixes for function N of component 1 should be decreased for the given customer system 130, as indicated in Table 1. As yet another example, the given customer system 130 corresponding with the exemplary individual report 300 has 45% of available software fixes for the function Z of component n installed and all reporting customer systems 130 have 40% of available software fixes installed on average. In this case, the information suggests that the current velocity (i.e., software fix installation rate) can be maintained, as indicated by the recommendation in Table 1.

TABLE 1

Suggestion for installation velocity corresponding with each function.

| FUNCTION IDENTITY | RECOMMENDATION |
|---|---|
| component 1 - function A | increase velocity of install of software fixes |
| ... | |
| component 1 - function N | decrease velocity of install of software fixes |
| ... | |
| component n - function X | increase velocity of install of software fixes |
| ... | |
| component n - function Z | maintain velocity of install of software fixes |

While the exemplary individual report 300 shown in FIG. 3 is at the function level, similar reports can be generated at every hierarchical level of the software package. For example, an individual report 300 and table of suggestions can be provided (at block 220) at the component level. The different hierarchical levels of the individual report 300 can correspond with recommendations at different hierarchical levels. For example, even if the execution behavior provided by the customer system 130 indicates that a given function of a component (e.g., function X of component n) is not executed, a component-level software fix can still be of interest (and indicated accordingly in the corresponding table) because it affects other functions of the component that are executed by the customer system 130.

The recommendation for a given function can be modified based on the execution behavior indicated by the customer system 130, when that information has been provided at block 210. For example, if the execution behavior indicates that the customer system 130 does not execute function X of component n, then the suggestion to increase velocity or installation rate of software fixes based on the percentages shown in the individual report 300 can be modified. A decreased velocity or even a recommendation not to install software fixes for the function can be indicated in Table 1 instead.

The recommendation for a given function can also be modified based on the encountered issues reported by the customer system 130, when that information has been provided at block 210. For example, if the percentage of installed software fixes for a given customer system 130 is close to the percentage of installed software fixes on average for all customer systems 130, an increase in velocity of installs can be recommended when the given customer system 130 has indicated that issues have been encountered when executing the corresponding function or component. For example, the software fix registration information (at block 230) can indicate issues being encountered based on software fixes indicated as being of interest.

The individual report 300 at one or more hierarchical levels and the corresponding suggestions can be used by a customer system 130 to manage the installation of software fixes. As previously noted, the suggested software fixes can also be installed automatically. This automated management of software fix installation improves the performance and manageability of the software package and the customer system 130.

Figure 4:
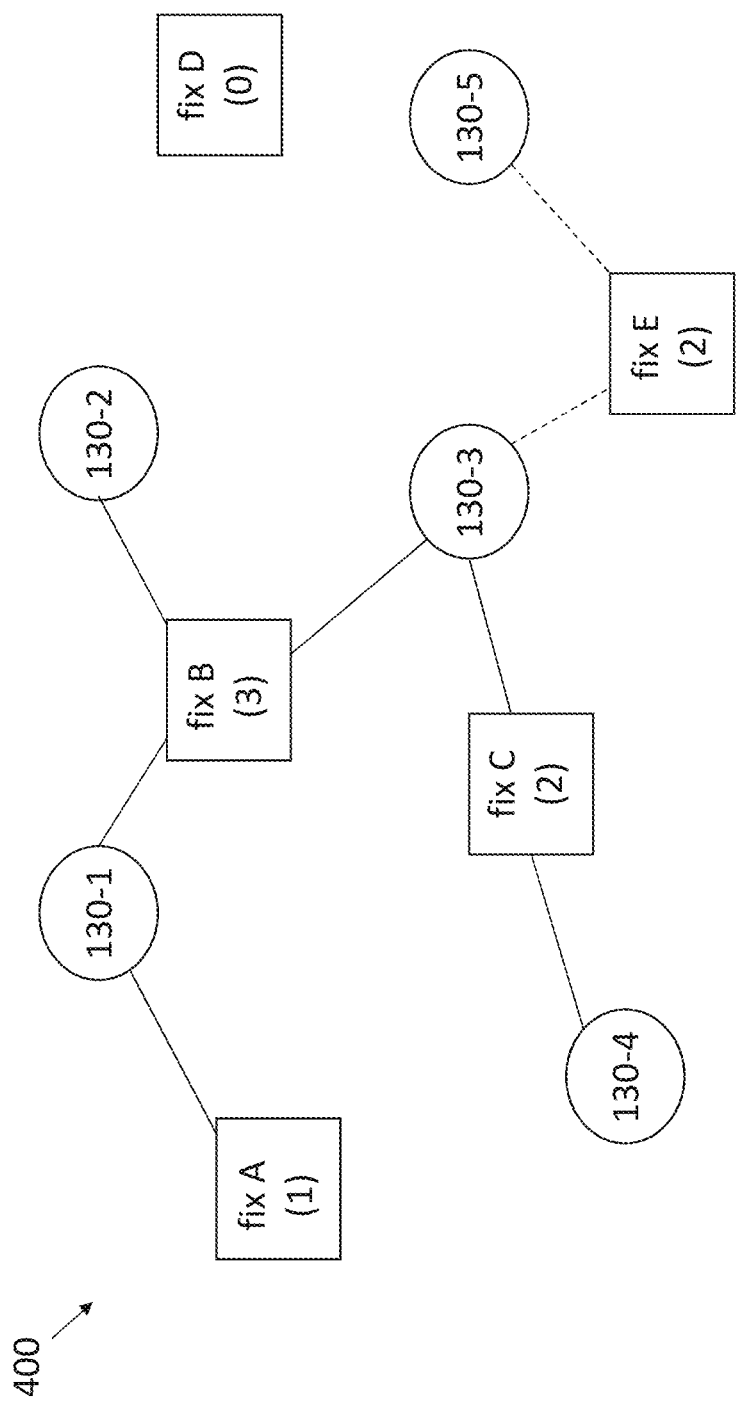
FIG. 4 is an exemplary mapping generated by the management system according to one or more embodiments of the invention.

FIG. 4 is an exemplary mapping 400 generated by the management system 100 (at block 240) according to one or more embodiments of the invention. The mapping 400 is generated based on the snapshot of software fix installs provided by each customer system 130 (at block 210) and also on the software fix registration information (at block 230). Specifically, each software fix is mapped to the zero or more customer systems 130 that have installed the software fix (in the case of an available software fix) or requested the software fix (in the case of an as-yet unavailable software fix). Exemplary software fixes fix A through fix E are shown along with exemplary customer systems 130-1 through 130-5.

Solid lines are used to indicate installed software fixes. The snapshot of software fix installs provided by each customer system 130 (at block 210) indicates this information. For example, according to the solid line between customer system 130-1 and fix A, customer system 130-1 has installed the fix A software fix. Dashed lines are used to indicate requested software fixes that have not yet been provided (e.g., software fixes for which a customer system 130 has registered (e.g., expressed interest) that are being completed). The software fix registration information (at block 230) indicates this information. For example, according to the dashed line between customer 130-3 and fix E, customer system 130-3 has registered to receive the fix E software fix. Each software fix may also indicate the number of connected customer systems 130. For example, the fix C software fix includes a "(2)" to indicate that two customer systems 130-3 and 130-4 are connected to it, thereby indicating that two customer systems 130 have installed the fix C software fix. As another example, fix D includes a "(0)" to indicate that no customer systems 130 have installed that software fix.

At block 240, in addition to providing the mapping 400 for display to each customer system 130, the management system 100 can use the information in the mapping 400 to manage software fixes. For example, the exemplary mapping 400 indicates that two customer systems 130-3 and 130-5 are awaiting the fix E software fix. If only one customer system 130 were awaiting another software fix, the management system 100 can indicate that the development of fix E should be prioritized over the other software fix. On the other hand, if three or more customers were waiting to install another software fix, the management system 100 can indicate that the development of the other software fix should be prioritized over the development of fix E.

At block 240, the management system 100 can also use the information in the mapping 400 to provide or enhance recommendations to each customer system 130. The individual report 300 generated at one or more hierarchical level and the mapping 400 can be used together to provide recommendations to a given customer system 130 (at block 240). For example, the individual report 300 at the component level can indicate that velocity of install should be increased for a given component of the software package. The mapping 400 can then be used by the management system 100 to generate suggestions of specific software fixes to install. For example, all the software fixes corresponding with the given component can be ranked by the management system 100 based on the number of other customer systems 130 that have already installed the software fix. By installing the most commonly installed software fixes pertaining to the given component, the customer system 130 can maintain a more common configuration that can be easier to manage, as previously noted. In addition, when an issue has been encountered for a given function or component (as reported at block 210), software fixes specific to the encountered issue can be suggested or pushed for installation.

The mapping 400 also facilitates notification (at block 240) of upcoming software fixes. For example, the exemplary mapping 400 of FIG. 4 can notify customer system 130-1 that the fix E software fix is being developed and has already been requested by customer systems 130-3 and 130-5. Based on the function or component corresponding with the fix E software fix and the indication in the individual report 300 for that function or component (e.g., an increase in velocity of install is suggested in the individual report 300 for the function or component associated with fix E), customer system 130-1 can also register for the fix E software fix. Like the individual report 300, the mapping 400 alone can be used to manage installation of software fixes at customer systems 130. As noted, according to one or more embodiments of the invention, the individual report 300 at one or more hierarchical levels can be considered along with the mapping 400 to further refine the management of software fix installation rate.

According to one or more embodiments of the invention, the functionality described for a customer system 130 and for a management system 100 can be performed by the same processing circuitry 110 and memory 115. That is, a customer system 130 that executes the software package can obtain information from other customer systems 130 and generate the individual report 300 at one or more hierarchical levels and the mapping 400 in order to automatically manage software fix installation rate.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of automating software fix installation rate management for a software package including two or more hierarchical levels, the method comprising:
   obtaining, at a management system, information from two or more customer systems, wherein the information indicates software fixes installed for the software package at each of the two or more customer systems;
   generating, at the management system, a report corresponding with each of the two or more customer systems, wherein the report indicates a number of the software fixes among available ones of the software fixes installed at a respective one of the two or more customer systems as compared with an average number of the software fixes installed at the two or more customer systems at one of the two or more hierarchical levels;
   determining, by the management system, whether to increase, decrease, or maintain a rate of installation of the software fixes at each of the two or more customer systems based on the report corresponding with each of the two or more customer systems; and
   pushing, by the management system, one or more of the software fixes for automated installation by one or more of the two or more customer systems based on the management system determining that the rate of installation of the software fixes should be increased at the one or more of the two or more customer systems.

2. The computer-implemented method according to claim 1, further comprising obtaining registration information from the two or more customer systems, the registration information indicating upcoming software fixes requested by each of the two or more customer systems.

3. The computer-implemented method according to claim 2, further comprising generating a mapping that indicates every one of the two or more customer systems associated with each one of the software fixes and each of the upcoming software fixes.

4. The computer-implemented method according to claim 3, further comprising determining the software fixes for installation by each of the two or more customer systems based on the mapping and the report corresponding with each of the two or more customer systems.

5. The computer-implemented method according to claim 1, further comprising obtaining, at the management system, an indication of issues with the software package encountered at each of the two or more customer systems.

6. The computer-implemented method according to claim 5, wherein the determining whether to increase, decrease, or maintain the rate of installation of the software fixes at each of the two or more customer systems is modified based on the indication of issues at each of the two or more customer systems.

7. The computer-implemented method according to claim 1, further comprising obtaining, at the management system, execution behavior of the software package at each of the two or more customer systems.

8. The computer-implemented method according to claim 7, wherein the determining whether to increase, decrease, or maintain the rate of installation of the software fixes at each of the two or more customer systems is modified based on the execution behavior at each of the two or more customer systems.

9. A management system supporting two or more customer systems that execute a software package including two or more hierarchical levels, the management system comprising:
   an interface configured to obtain information from the two or more customer systems, wherein the information indicates software fixes installed for the software package at each of the two or more customer systems; and
   a processor configured to generate a report corresponding with each of the two or more customer systems, wherein the report indicates a number of the software fixes among available ones of the software fixes installed at a respective one of the two or more customer systems as compared with an average number of the software fixes installed at the two or more customer systems at one of the two or more hierarchical levels, to determine whether to increase, decrease, or maintain a rate of installation of the software fixes at each of the two or more customer systems based on the report corresponding with each of the two or more customer systems, and to push one or more of the software fixes for automated installation by one or more of the two or more customer systems based on determining that the rate of installation of the software fixes should be increased at the one or more of the two or more customer systems.

10. The management system according to claim 9, wherein the interface is further configured to obtain registration information from the two or more customer systems, the registration information indicating upcoming software fixes requested by each of the two or more customer systems, and the processor is further configured to generate a mapping that indicates every one of the two or more customer systems associated with each one of the software fixes and each of the upcoming software fixes.

11. The management system according to claim 10, wherein the processor is further configured to determine specific ones of the software fixes for installation by each of the two or more customer systems based on the mapping and the report corresponding with each of the two or more customer systems.

12. The management system according to claim 9, wherein the interface is further configured to obtain an indication of issues with the software package encountered at each of the two or more customer systems, and the processor is further configured to modify a determination of whether to increase, decrease, or maintain the rate of installation of the software fixes at each of the two or more customer systems based on the indication of issues at each of the two or more customer systems.

13. The management system according to claim 9, wherein the interface is further configured to obtain execution behavior of the software package at each of the two or more customer systems, and the processor is further configured to modify a determination of whether to increase, decrease, or maintain the rate of installation of the software fixes at each of the two or more customer systems based on the execution behavior at each of the two or more customer systems.

14. A computer program product for automating software fix installation rate management for a software package including two or more hierarchical levels, the computer program product comprising a computer readable storage medium having program instructions embodied therewith, the program instructions executable by a processor to perform a method comprising:
obtaining information from two or more customer systems, wherein the information indicates software fixes installed for the software package at each of the two or more customer systems;
generating a report corresponding with each of the two or more customer systems, wherein the report indicates a number of the software fixes among available ones of the software fixes installed at a respective one of the two or more customer systems as compared with an average number of the software fixes installed at the two or more customer systems at one of the two or more hierarchical levels;
determining whether to increase, decrease, or maintain a rate of installation of the software fixes at each of the two or more customer systems based on the report corresponding with each of the two or more customer systems; and
pushing one or more of the software fixes for automated installation by one or more of the two or more customer systems based on the management system determining that the rate of installation of the software fixes should be increased at the one or more of the two or more customer systems.

15. The computer program product according to claim 14, further comprising obtaining registration information from the two or more customer systems, the registration information indicating upcoming software fixes requested by each of the two or more customer systems, and generating a mapping that indicates every one of the two or more customer systems associated with each one of the software fixes and each of the upcoming software fixes.

16. The computer program product according to claim 15, further comprising determining specific ones of the software fixes for installation by each of the two or more customer systems based on the mapping and the report corresponding with each of the two or more customer systems.

17. The computer program product according to claim 14, further comprising obtaining an indication of issues with the software package encountered at each of the two or more customer systems.

18. The computer program product according to claim 17, wherein the determining whether to increase, decrease, or maintain the rate of installation of the software fixes at each of the two or more customer systems is modified based on the indication of issues at each of the two or more customer systems.

19. The computer program product according to claim 14, further comprising obtaining execution behavior of the software package at each of the two or more customer systems.

20. The computer program product according to claim 19, wherein the determining whether to increase, decrease, or maintain the rate of installation of the software fixes at each of the two or more customer systems is modified based on the execution behavior at each of the two or more customer systems.

* * * * *